Figure 1:
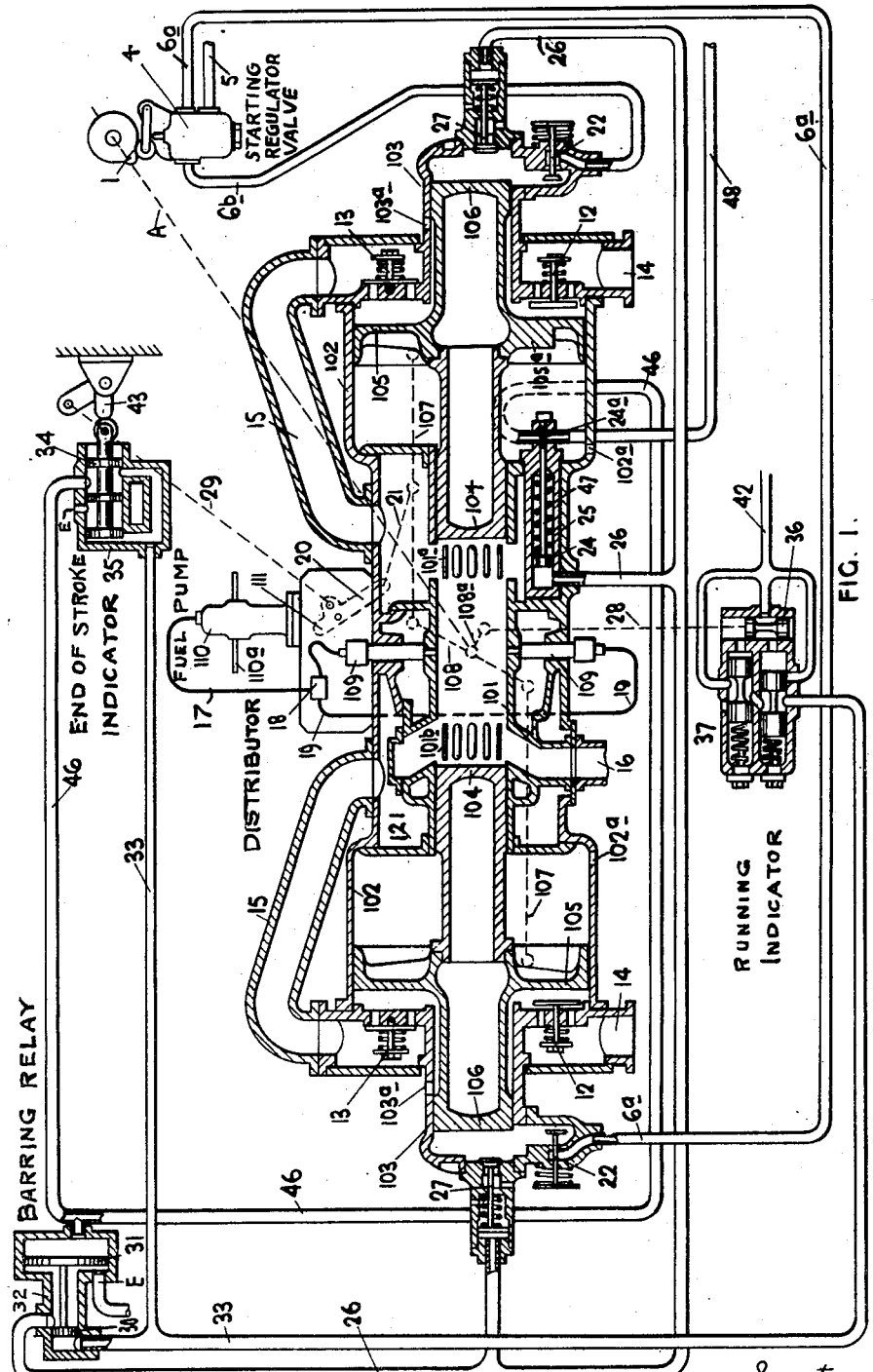

Sept. 23, 1952 R. J. WELSH 2,611,233
STARTING DEVICE FOR FREE PISTON INTERNAL-COMBUSTION
OPERATED COMPRESSORS OR GAS GENERATORS
Filed July 18, 1947 3 Sheets-Sheet 3

Inventor:
Robert J. Welsh
By Babcock & Babcock
Attorneys

UNITED STATES PATENT OFFICE 2,611,233

STARTING DEVICE FOR FREE PISTON INTERNAL-COMBUSTION OPERATED COMPRESSORS OR GAS GENERATORS

Robert James Welsh, Rugby, England, assignor to The English Electric Company Limited, London, England, a British company Application July 18, 1947, Serial No. 761,752
In Great Britain May 24, 1946

11 Claims. (Cl. 60—14)

This invention is a modification of the invention described in Patent No. 2,434,877 (application No. 559,976) filed October 23, 1944 and relates to a starting device for a free piston internal combustion operated compressor—i. e. an engine wherein a compressor piston is directly connected to, or combined with, an internal combustion engine piston and wherein the motion of this piston assembly is not constrained by coupling through connecting rods and cranks to rotating members. There are usually two opposed engine pistons reciprocable towards and away from each other in one cylinder. The engine is usually one which operates on a two-stroke compression-ignition cycle, some or all of the air from the compressor serving to scavenge and charge the engine cylinder.

An engine of this kind may be used as a gas-generator to supply another piece of apparatus such as a gas turbine, which may have as its working fluid either (i) solely air coming direct from the compressor or (ii) solely the exhaust from the engine cylinder (comprising the products of the combustion in the engine cylinder mixed with the scavenging air supplied to the engine by the compressor) or (iii) a mixture of the engine exhaust with air coming direct from the compressor. The second of these three alternatives is most usual.

The invention employs gas pressure from a source of, for example, compressed air for starting the engine, this gas—hereinafter referred to as air—being admitted either to an auxiliary starting cylinder or to a cylinder serving some other function during normal operation of the engine. A free piston type compressor or gas generator as defined above has usually, in addition to the internal combustion and compressor cylinders, a separate buffer cylinder or cylinders, in which reciprocates some part of the free piston assembly for compressing air during the expansion stroke of the engine, the pressure of which air serves to return or to assist in the return of the free piston assembly and the compression of a fresh charge in the internal combustion cylinder in readiness for the next expansion stroke, and the engine may be started by supplying compressed air from a source of comparatively unrestricted capacity to this buffer cylinder or to the compressor cylinder. It is necessary that this supply of air—or indeed the application of air in any other way for starting the engine—should not interfere with subsequent normal operation. The starting air will escape from the cylinder in the usual way at the end of a full stroke through a port uncovered by the piston when near its inner dead centre position.

The invention comprises means for admitting compressed air to a cylinder of the engine in a number of automatically repeated impulses whereby the free piston assembly is reciprocated until the engine fires regularly, when the supply of compressed air is cut off and the normal operation of the engine begins.

The free piston assembly may be set at or near to its outer dead centre position in readiness for starting. An operating member such as a cam which is controlled by the free piston assembly in accordance with its position relative to the engine cylinders is so arranged as to open a valve in the supply line of compressed air to the respective cylinder of the engine whenever the piston assembly reaches a certain range in the outer portion of its stroke.

When starting the engine, this range is passed through the first stroke from the said position at or near to the outer dead centre, under the influence of compressed air admitted directly into the cushion cylinder. The said cam or the like then opens the automatic valve and admits an impulse of compressed air to the inwardly moving piston assembly which, consequently, is driven vigorously towards its inner dead centre position.

The automatic valve is opened again by the said cam when the pistons rebound from their inner dead centre position under the action of the air which is compressed in the combustion cylinder or under the pressure of the internal combustion if the engine fires—the compressed air having mostly escaped from the cushion cylinder at the inner end of its stroke, so that no abnormal inward force opposes said rebound.

A new inward impulse is thus given to the free piston assembly when reaching again the outer portion of its stroke, but this time at a point more remote from the outer dead centre position, which impulse drives the free piston assembly back towards its inner dead centre position more vigorously still.

This process is repeated until the engine is firing regularly, when the main supply of compressed air is cut off and the operation of the automatic valve rendered ineffective. As stated initially, the present invention is a modification of the invention disclosed and claimed in Patent No. 2,434,877 (application No. 559,976), filed October 23, 1944, which is for a device for starting the gas generator by admitting air in a number of separate impulses. This is effected in Patent No. 2,434,877 by means of either a ratchet sector and pawl device or by means of the starting regulator shown. Both these alternatives require that the inlet valves 55 or 51 respectively are open prior to the first starting impulse. This opening is effected by means of a spring 58, in the case of the pawl and ratchet device (Figs. 3 to 8) the compressed air supply being shut, or by virtue of the position of cam 33 in the embodiment of Fig. 2 which is related to the position of the generator pistons. Once the first impulse has been effected both embodiments continue to give a series of impulses until the generator is firing correctly, after which both embodiments rely on the air pressure to close their respective valves 55 or 38.

Figure 2:
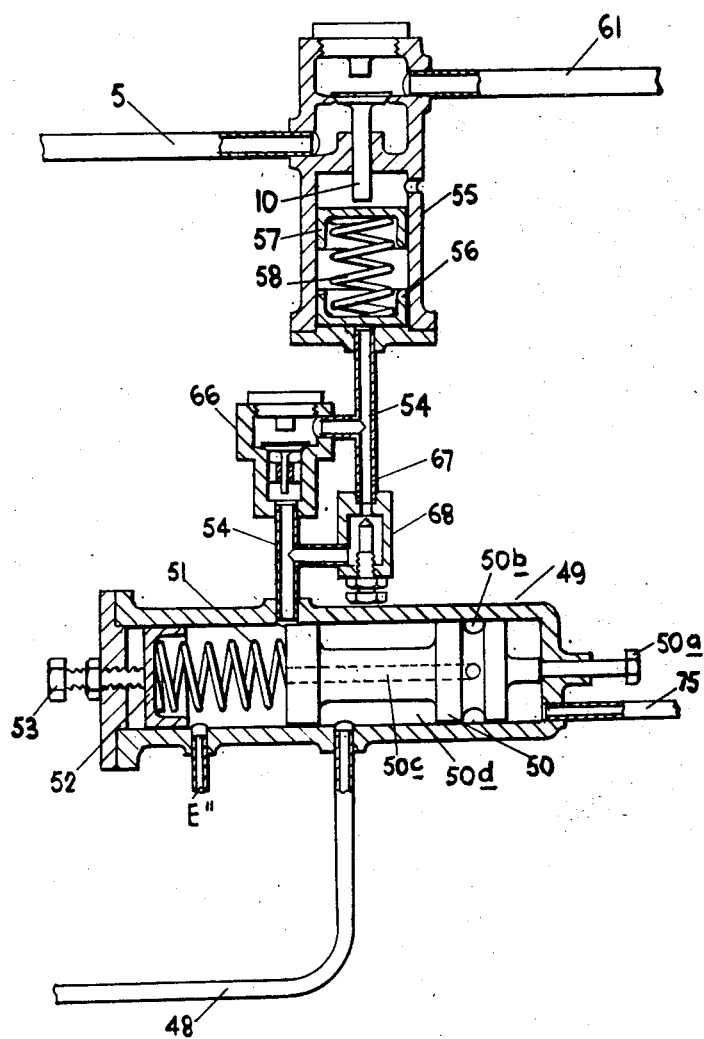

In the present application, too, air is admitted in a number of impulses but the duration of these impulses is timed in a different manner, i. e. by means of the rotational oscillation of the starting cam 1 (Fig. 4) oscillating in accordance with the reciprocating movement of the free piston units, in conjunction with a master starting valve 10 (Fig. 2). When starting air is admitted to the starting device from the master starting valve 10 the air tends to keep valve 3 (Fig. 4) closed but the air which has got past valve 3 starts the generator piston units moving which in turn oscillate the starting cam 1. The cam 1 thus suddenly opens the valve 3 allowing a sudden impulse to strike the generator piston units which starts the units reciprocating. This movement of the piston units continues to cause cam 1 to open valve 3 periodically thus passing a series of air pressure impulses, one per stroke, to the free pistons until the generator is running. The master starting valve 10 then shuts off the starting air supply to the engine, the cam device 1 not having any control over the air supply from the pressure source.

A different aspect of the problems involving the starting of free piston engines is dealt with in Patent No. 2,434,778 (application No. 546,360) filed July 24, 1944, which is for the cyclic control, i. e. arranging that the gas generators come into action when required in a cyclic order so that each will do a fair share of work over a long period.

Figure 4:
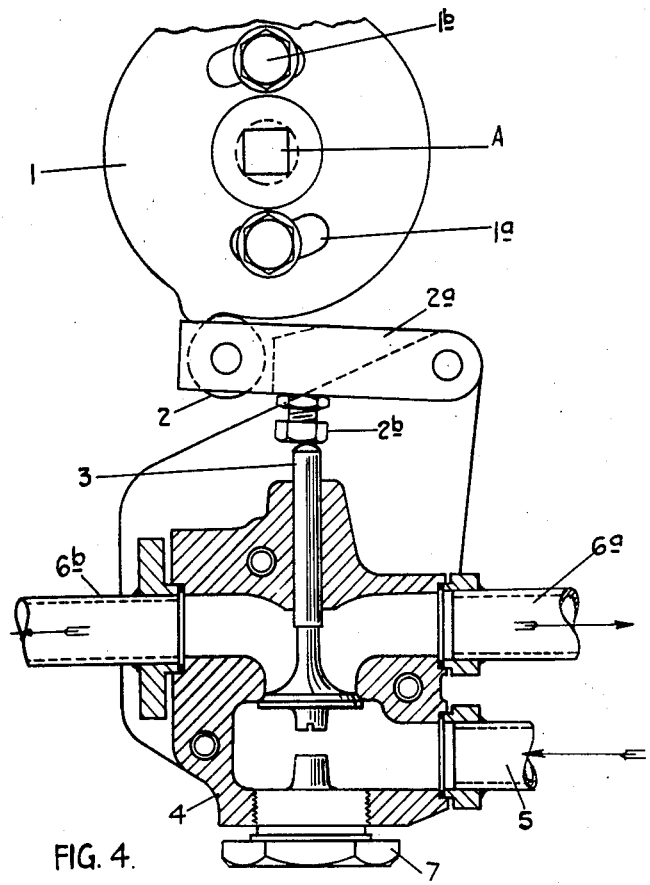
Figure 3:
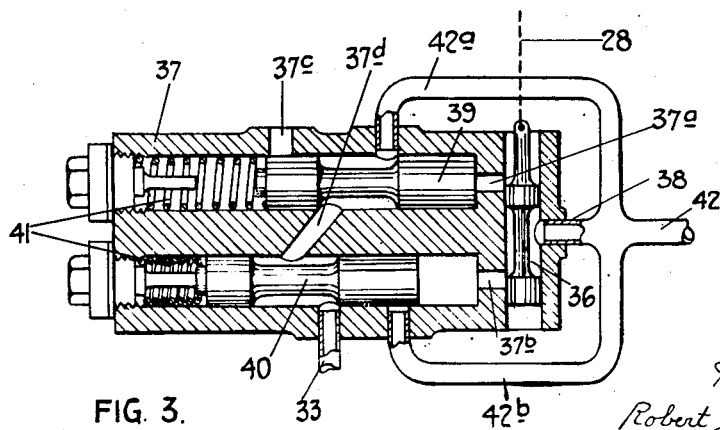

In order to be better understood and readily carried into effect, the invention will be described by way of example with reference to the drawings, of which:

Fig. 1 shows a general arrangement of a free piston internal combustion operated gas generator incorporating the starting device according to the invention, Fig. 2 shows a master starting valve connected with the general arrangement of Fig. 1, forming, in fact, part of it, and shown in a separate figure only for clarity to allow of a bigger scale for the Figure 2, Fig. 3 shows a detail of Fig. 1 on an enlarged scale, and Fig. 4 is an elevation, partly in section, on a larger scale, of an embodiment of the starting device according to the invention, as diagrammatically indicated on Fig. 1.

Referring first to Fig. 1, the free piston internal combustion operated gas generator comprises, as usual, a common combustion cylinder 101, two compressor cylinders 102 in alignment with said combustion cylinder on either end of it, and two cushion cylinders 103 in alignment with and on the outer ends of said compressor cylinders. Two free piston assemblies, each consisting of a combustion engine piston 104, a compressor piston 105 and a cushion cylinder piston 106 are adapted to reciprocate symmetrically in the said cylinders, synchronization between them being effected for example by the usual linkage system 107, 108, 107.

Air is supplied through the inlet manifolds 14 and spring-loaded suction valves 12 (one only of which is shown per side) into the compressor cylinders 102, the inner sides of which are vented to the atmosphere by ports 102a. Compressed air is supplied from the compressor cylinders 102 through spring loaded delivery valves 13 (one only of which is shown per side) and transfer pipes 15 to the chamber 121 surrounding the combustion cylinder 101, into which it is discharged as soon as the ports 101a are uncovered by the right hand side piston 104.

When the pistons are in or near their inner dead centres, fuel oil is injected into the combustion cylinder 101 by a conventional fuel pump 110 through pipes 17, distributor 18, pipes 19 and injectors 109. When the pistons, operating on a two stroke compression ignition cycle, have moved outward far enough to uncover the exhaust ports 101b, the exhaust gases and compressed air scavenging the cylinder 101 via the ports 101a and 101b are discharged through pipe 16 to a gas turbine (not shown) as the motive gases for such prime mover.

The fuel pump 110 is controlled by the usual rack 110a and operated by a cam 111 which is oscillated by a lever 20 which is connected by the link 21 with a component such as 107 of the synchronizing mechanism for the free piston assemblies.

Another cam 1, the purpose of which will be described later in connection with the starting mechanism according to the invention, is also oscillated by the said synchronizing mechanism, and so is a lever 108a operating, through a link 28, the "running indicator" 37 shown on the bottom of Fig. 1 and, on an enlarged scale, separately in Fig. 3. The "running indicator" (Fig. 3) is a hydraulic device comprising piston valve 36 reciprocated by the link 28 in a transverse cylinder in the body 37. In one extreme position this valve 36 connects one of two longitudinal cylinders in the same body to fluid pressure supply pipe 38 through a comparatively restricted orifice 37b and the other of said cylinders to exhaust through a similar orifice 37a; in the other extreme position the valve 36 reverses these connections while during its movement from one position to the other the valve temporarily connects both cylinders to exhaust. In each cylinder is one of a pair of double pistons 39 and 40 which, under fluid pressure through orifices 37a and 37b, can move outwards against a very light biasing force provided by springs 41. These pistons form valves which serve together to connect the pipe 33 to exhaust 37c only when applied pressure has moved both pistons out; when either is held in by the biasing force of spring 41, the pipe 33 is connected to the fluid pressure pipe 42, which is supplied by any known source of pressure such as any suitable oil pump, not shown in the drawing for simplicity. When the engine is at rest the control valve 36 can only be in a position in which at least one of the said cylinders of the "running indicator" is connected to exhaust, and so the pipe 33 will be connected to pressure. When the engine is running and the control valve 36 is reciprocating the said cylinders are connected alternately to pressure and to exhaust but they are not connected to the exhaust long enough through the restricted orifices 37a and 37b for the light biasing force of springs 41 to impart any appreciable inward movement to either piston; accordingly both pistons remain out and the pipe 33 remains connected to exhaust by the port 37c in the body 37.

The fluid pressure in pipe 33—as soon as the engine stops—moves the piston unit 34 of the "end of stroke indicator" outward to a position in which it can be operated by motion of the free pistons. The fluid pressure in pipe 33, by acting on the smaller piston 30 of the "barring relay" moves this also in one direction, to allow the fluid pressure to pass by way of pipe 26 to open the compression relief valves 27 in the buffer cylinders and also to enter the barring cylinder 25, thus causing the barring piston 24 to move outwards to bear on a shoulder 5a on the inner side of the right hand compressor piston 5 (which is linked to the left hand compressor piston 5 by the linkage 7, 8, 7 indicated in dotted lines in Fig. 2) so as to drive the free pistons to their outer dead centre position. When the free pistons approach or reach their outer dead centre position a cam 43 actuated by them through link 29 and the lever 20 connected by the link 21 to the synchronising linkage, is rocked about the fixed pivot 44 to engage a roller 45 on the projecting end of the piston rod of the "end of stroke indicator," forcing the triple piston 34 inwards to the position shown and thereby connecting the fluid pressure from pipe 33 by way of pipe 46 to a rear part of the barring relay, behind the piston 31, which is shown as of greater area than the front piston 30 so that the force from the rear will overcome that from the front. The latter relay is thus moved back to its normal position (as shown) to disconnect pipe 26 and the barring cylinder 25 from the pipe 33 and to connect them to exhaust, whereby the barring piston 24 is withdrawn by the action of a biasing force such as that of a spring 47 and the relief valves 27 in the buffer cylinders 3 can reclose. The barring piston 24, when completely withdrawn, re-establishes a connection from the pipe 33 through the "end of stroke indicator" cylinder 35, pipe 46, and ports uncovered and put into communication by the reduced portion 24a of the piston rod of the barring piston 24 to pipe 48 and a port in a "starting relay" 49 hereinafter described with reference to Fig. 3. When the barring piston and co-operating parts have gone through the operations described the whole equipment is then reset and ready for restarting, the resetting having taken place automatically in immediate response to the stopping of the engine.

A "barring" cylinder 25 is arranged, preferably within the casing 121 that surrounds the combustion cylinder 101, so that the free end of the rod of piston 24 fitting said barring cylinder is adapted to bear on the shoulder 105a of one of the compressor pistons 105. A spring 47 tends to withdraw the said piston 24 into its cylinder 25.

Spring loaded vent valves 27 are arranged in each of the cushion cylinders 103, which are moreover vented by ports 103a whenever the pistons 106 approach their inner dead centre positions. The valves 27 can be opened against their spring bias under fluid pressure coming from pipes 26 and acting on pistons integral with said valves.

Compressed air can be supplied to the cushion cylinders 103 through spring loaded automatic non-return valves 22 from pipes 6a, 6b connected with the automatic starting regulator valve 4, which will be described more in detail with reference to Fig. 4 and which is connected by pipe 5 to the master starting valve 10 (Fig. 2) which will also be described later more in detail. Valve 10 is connected with a comparatively unlimited supply of compressed air through pipe 61.

Referring now particularly to Fig. 3 the "running indicator" 37 operates as follows—

The link 28 which, as previously stated operates the running indicator, is coupled to the piston valve 36 which is therefore oscillated when the free piston compressor is running. The length of the valve 36 is such that when the compressor is at rest one or other of the ports 37a or 37b is open to exhaust past the outer edges of the valve and the remaining port (37a or 37b) is opened to pressure from the pipe 38 by one of the inside edges of the valve. In a "rest" position with the valve 36 in the position shown, fluid pressure from the supply pipe 42 will pass through the pipe 38, enter the recess in the valve 36, pass through the open port 37b and move the piston 40 to the left against its weak spring 41.

The port 37a is closed to pressure from pipe 38 by the valve 36 but is open to exhaust past the upper edge of the said valve and will therefore be moved to the right by its spring 41. Pressure fluid can also pass by way of the branch pipe 42a, through the recess in piston 39, the oblique port 37d and the recess in piston 40 to the pipe 33. It will be clear from Fig. 3 that if the free piston assemblies were in a rest position whereby the valve 36 was moved upwards to open port 37a to pressure from pipe 38 and open port 37b to exhaust past its lowest edge, the positions of pistons 39 and 40 would be reversed. Pressure from pipe 42 could still, however, reach pipe 33 because piston 40 would be moved to the right by its spring 41 whereby branch pipe 42b would communicate with pipe 33 through the recess in piston 40 and the oblique port 37d would be closed by the left hand end of the said piston. Piston 39 would be in the left hand position and the pipe 42a would be shut off.

As soon, however, as the free piston assembly is reciprocating, the piston valve 36 is oscillated through its link connection 28 and lever 108a so that the ports 37a and 37b are alternately opened to pressure from pipe 38 and to exhaust past the outer edges of the valve. Sufficient fluid pressure is passed through pipe 38 round the recess of valve 36 and the ports 37a and 37b to force both pistons 39 and 40 to the left against their weak springs 41. The ports 37a and 37b are of a restricted cross section and do not allow the escape of fluid to exhaust to take place quickly enough to effect the building up of pressure inside the cylinders for the pistons 39 and 40. From Fig. 3 is will be seen that in this position of the "running indicator" in which both pistons 39 and 40 are over to the left, pipe 33 is cut off from both branch pipes 42a and 42b and hence from pressure from pipe 42 and is vented to exhaust at 37c past the recessed portions of both pistons, 39, 40 and the oblique canal 37d in the body of the casing 37.

Thus pipe 33 is under pressure when the free piston compressor is stationary, and is opened to exhaust when the compressor is running.

Returning now to Fig. 1, the barring cylinder 25 is connected with the "barring relay" 32 by pipe 26 which, as mentioned above, supplies fluid pressure also to the pistons of the vent valves 27. The barring relay comprises two cylinders of different diameter arranged in alignment and containing the assembly of a small piston 30 and a large piston 31. The outer end of the small cylinder is connected through pipe 33 with the "running indicator" 37 and through the latter with a supply of pressure fluid 42. The inner port of the small cylinder of the barring relay 32 is connected with the aforementioned pipe 26. The outer end of the large cylinder is connected through pipe 46 with the bore in which the rod of piston 24 is adapted to move. In the inner position of said piston 24 a recess 24a in the piston rod opens a passage for the fluid from pipe 46 to pipe 48 but in the outer position of piston 24 said passage is blocked by the piston rod. The inner end of the large cylinder of relay 32 communicates with the inner end of the small cylinder of said relay and is open to exhaust at E.

Barring operation

Fluid pressure from pipe 42 is supplied through the running indicator 37 (in the position as shown in Figs. 1 and 3) and pipe 33 to the outer end of the small cylinder of the barring relay 32. A branch of pipe 33 is connected with the "end of stroke indicator" 35, and the fluid pressure from pipe 33 pushes the tripartite piston 34 thereof to the right where it connects pipe 46 to exhaust at E'.

As the outer end of the large cylinder of the barring relay 32 is connected with pipe 46, the fluid pressure on the outer end of the small piston 30 can push the pistons 30, 31 to the right, thereby uncovering the port of pipe 26, and admit fluid pressure through said pipe to the pistons of the vent valves 27, opening them, and to the barring cylinder 25 the piston 24 of which will then be moved to the right, against the bias of spring 47, and push the free piston assemblies 104, 105, 106, near to their outer dead centre position, the air from the cushion cylinders 103 escaping through the vent valves 27.

The outward movement of the free piston assembly is transmitted by the link 29 to the cam 43 which pushes the tripartite piston 34 back to the left hand position as shown where it connects pipe 46 to the fluid pressure from pipe 33 which acts now on the outer side of the large piston 31 of the barring relay 32 and pushes it back to its left hand position as shown, overriding the pressure acting on the small piston 30. Any fluid contained between the pistons 30 and 31 is drained at E, and as soon as piston 30 has cleared the port of pipe 26, the pressure in that pipe also escapes through E. Consequently the vent valves 27 close under the spring bias, and the barring piston 24 is withdrawn to the left into its cylinder 25 by its spring 47.

In this retracted position of the barring piston 24, communication is established through the recess 24a, as stated above, between pipe 46 and the pipe 48 leading to the starting relay 49 shown in Fig. 2.

Starting relay

This relay comprises a piston 50 which in its rest position is biased to the right by a spring 51 the force of which can be adjusted by an abutment 52 and a set screw 53. The piston 50 has a projection 50a extending outside, and two recesses, a narrow one 50b and a wider one 50d. A bore 50c connects the recess 50b with the left hand port of the relay cylinder 49 which is drained at E".

The right hand end of cylinder 49 is connected with a pipe 75 adapted to apply fluid pressure under remote control. The central portion of the cylinder 49, i. e. the one corresponding to the wide recess 50d of the piston 50 is connected with the aforesaid pipe 48.

The portion of cylinder 49 which is cut off from pipe 48 by the piston 50 in its right hand position as shown is connected by a pipe 54 containing a non-return valve 66 and a by-pass 67 containing an adjustable leak-off 68 with the servo-motor cylinder 55 containing two pistons 56, 57 spaced apart by a spring 58. Piston 57 is adapted to bear on the stem of the master valve 10 which is normally kept in its closed position by its own weight and by the air pressure coming from the source of compressed air via pipe 61 acting on its upper surface. The underside of said master valve 10 is connected by pipe 5 with the casing 4 of automatic starting regulator valve which is shown in outline in Fig. 1 and in section on a larger scale in Fig. 4.

Starting regulator

Referring now particularly to the last mentioned figure, a cam 1 is arranged on a shaft A which performs a rotational oscillation in accordance with the reciprocating movement of the free piston assemblies 103, 104, 105 by being connected, for example, in the link mechanism 107, 108, 107 serving to synchronize the movements of two opposed free piston assemblies. Cam 1 engages a roller 2 at the end of lever 2a which is pivoted on a lug of the valve casing 4 and carries an adjustable screw 2b that engages the end of the spindle of a valve 3 the seat of which is arranged in the casing 4. This casing is connected, as stated, with the source of compressed air supply by a pipe 5 in which there is the master valve 10, an automatic embodiment of which has been described with reference to Fig. 2, and by pipes 6a, 6b, with the non-return valves 22 (Fig. 1) leading into the cushion cylinders 103 of the free piston compressor.

In the position as shown in Fig. 4, the valve 3 is in its closed position, which it assumes in operation under the excess pressure of the compressed air acting on its under side unless it is depressed by the lever 2a operated by cam 1 as will be described later more in detail.

When in readiness for operation the valve 3 is, however, in its open position into which it drops under its own weight at the end of the foregoing starting operation.

The connection of cam 1 and shaft A may be adjustable, for example, by means of slots 1a in the disc of cam 1 which are engaged by clamping screws 1b connected with a flange (not shown) of shaft A.

The movement of valve 3 is limited by a stop 7 so as to keep the undersurface of the valve exposed to the onrush of the compressed air when the master valve 10 is opened.

Starting operation

The starting operation is as follows:

The free piston assemblies have been "barred" at, or preferably slightly inwards of, their outer dead centre position as described. In this position of the free piston assemblies, cam 1 is in the position as shown in Fig. 4. If now the master valve 10 is opened, as will be described later more in detail with reference to Fig. 2, air from pipe 5 is admitted to the cushion cylinders 103 past the open valve 3 which, however, is then lifted by the onrush of air and subsequently held against its seat in the casing 4 by the excess air pressure acting on its underside.

Under the action of the compressed air that got into the cushion cylinders 103 past valve 3 before it closed, the free piston assemblies 104, 105, 106 are moved inwards from their position near their outer dead centres. This movement is transmitted through axis A to cam 1 which depresses the roller 2 of lever 2a which, in turn, momentarily depresses and opens valve 3.

Compressed air is thus admitted from the supply pipe 5 through valve 3, pipes 6a, 6b, and the non-return valves 22 to the cushion cylinders 103, and the free piston assemblies are accelerated inwards.

Fuel may be injected into the combustion cylinder 101 already at this stage and the energy of the explosion, although not yet sufficient to establish regular operation, may assist in returning the free piston assemblies towards their outer dead centre position. On this return movement of the free piston assemblies, the cam 1 does not move as far out as shown in Fig. 4, but far enough to depress the roller 2 with the opposite side of the cam toe and thus to open the valve 3 momentarily and to admit another impulse of compressed air to the cushion cylinders 103 which further accelerates the free piston assemblies inwards. This is repeated until the engine is firing regularly.

Referring now particularly to Fig. 2, it will be described how the master valve 10 of the compressed air supply can be opened for, and kept open during, the starting operation, and be closed again as soon as the engine is firing regularly:

If fluid pressure is applied, say by remote control, to the right of piston 50 through pipe 75, the piston valve 50 is moved to the left and pipe 54 will thus be put in communication with the fluid pressure supply pipe 48. As has been previously explained under the heading "Barring Operation," when the free piston assemblies have been barred out to a position ready for starting and the running indicator is at rest, that pressure fluid from pipe 42 can pass through the running indicator to line 33, through the "end of stroke" relay 35 in the left hand position of piston 34 to pipe 46, and past the recess 24a of the barring piston rod to pipe 48. Therefore, with the starting relay piston 50 in its left hand position, pressure fluid flows from pipe 48 (Fig. 2) past the wide recess 50d of piston 50, through pipe 54 and non-return valve 66 to the underside of the servo-motor piston 56. Accordingly, this piston rises, compresses spring 58 until piston 57 overcomes the air pressure acting on the top of the master starting valve 10, and throws it open, whereby the starting operations as described hereabove are initiated.

When the free piston assemblies are reciprocating, pressure is removed by the running indicator from the pipe 33. The drop of pressure in this pipe would be transmitted to the servo-motor cylinder 55 via pipe 46, recess 24a, pipe 48, relay cylinder 49 and recess 50d of piston valve 50, but the non-return valve 66 closes and the pressure in the servo-motor cylinder 55 can escape but gradually through by-pass 67 and the leak-off 68 to exhaust at E'' so that the master valve 10 cuts off the air supply with sufficient delay to allow the repeated application of starting air as described.

Recess 50b and bore 50c in piston 50 drain off to exhaust at E'' any pressure fluid which might have leaked into the right hand end of cylinder 49 from pipe 48 and thus prevents any unintentional starting.

Alternatively, the engine may be started manually by the operator pushing the projection 50a to the left, and holding it there against the bias of spring 51 until the engine is firing regularly. Any ordinary hand- or remote-control master air valve 10 may be used instead of the automatic device as shown in Fig. 2.

What I claim as my invention and desire to secure by Letters Patent is:

1. In a free piston internal combustion operated gas generator plant comprising a gas generator having an engine cylinder, at least one compressor cylinder, at least one buffer cylinder and at least one free piston assembly consisting of an engine piston, a compressor piston and a buffer piston freely reciprocating in the said cylinders an unrestricted source of compressed air, a pneumatic connection from said source to the said buffer cylinder, a hydraulically operated master starting air valve in said pneumatic connection, opening against the air pressure of said source, a source of hydraulic pressure, a hydraulic barring relay, an end of stroke indicator, a "running indicator" operably connected to the said free piston assembly, hydraulic connections from the said source of hydraulic pressure through the said running indicator to the said barring relay and end of stroke indicator, the said running indicator connecting the said barring relay and the said end of stroke indicator to the said source of hydraulic pressure when the gas generator is at a standstill and cutting them off when it is running, a spring biased hydraulically operated vent valve in the said buffer cylinder, a spring biased hydraulic barring servomotor, hydraulic connections from the said barring relay and the said end of stroke indicator to the said vent valve and barring servomotor, the said end of stroke indicator and the said barring relay admitting hydraulic pressure to the said vent valve and barring servomotor when the said free piston assembly is in a position remote from the starting position whereby the said vent valve is opened and the said free piston assembly is barred into its starting position, and cutting off said vent valve and barring servomotor from hydraulic pressure when the said free piston assembly is in the starting position, the said vent valve being then closed and the said barring servomotor withdrawn by their respective spring bias, a hydraulic connection of the said barring relay and end of stroke indicator to the said hydraulically operated master starting valve, and a valve in this last mentioned hydraulic connection controlled by the said barring servomotor so as to be opened in the retracted position thereof and closed during the barring operation: a starting relay, a starting device comprising in combination a starting air regulator valve, a non-return valve, both said valves arranged in succession in the said pneumatic connection between the said master starting air valve and the said cushion cylinder, and a starting cam operably connected to the said free piston assembly and opening said starting air regulator valve in synchronism with the reciprocating movement of the said free piston assembly whereby compressed air is admitted through the said non-return valve to the said buffer cylinder in a number of pulses while the master starting valve is kept open by hydraulic pressure.

2. A starting device as claimed in claim 1 in which the said barring relay comprises a stepped cylinder, a stepped piston adapted to move toand-fro in the said cylinder, the outer end of the narrow portion of the said stepped cylinder being connected with the said "running indicator," and a port in the said narrow portion being connected with the said barring cylinder and the said fluid pressure operated vent-valve, the space between the narrow and wide portion of the said stepped cylinder being open to exhaust and the end of said wide portion being in pipe connection with the said "end of stroke indicator."

3. A starting device as claimed in claim 1 comprising a recessed piston rod of the said barring servomotor, a pipe connection between the outer end of the large cylinder of the said barring relay and a port controlled by said recessed piston rod, a pipe connection between the said master starting valve servo-motor and another port controlled by the said recessed piston rod to admit communication between the said barring relay and the said servo-motor only when the said piston is retracted out of the range of the stroke of the free piston assembly.

4. A starting device according to claim 1 in which the said starting regulator valve comprises an air valve casing, a valve arranged in said casing and adapted to be closed by compressed air admitted to the upstream side of said air valve casing by the said master starting valve and to be opened by the said cam operably connected to the free piston assembly whereby compressed air can pass said valve and enter the said cylinder of the compressor or gas generator each time the free piston assembly reaches a point near the end of its stroke.

5. A starting device according to claim 1 wherein, as a means for initially moving the free piston assembly from its starting position, the said starting cam has a profile holding the said starting regulator valve in an open rest position exposed to the air stream from the said master starting valve when the latter is opened, and permitting the said starting regulator valve to be closed by the said air stream when the free piston assembly is moved from its starting position.

6. A starting device as claimed in claim 1, in which the said "end of stroke indicator" comprises a ported cylinder, a tripartite piston adapted to move to-and-fro in the said cylinder, one end of the said cylinder being in pipe connection with the said "running indicator" and the other end being open to atmosphere, a by-pass from the closed end of said cylinder to a port between the two outer portions of the said tripartite piston, the middle portion of said piston being adapted to control the port connecting the said ported cylinder with the said barring relay, and a cam operably connected to the free piston assembly and adapted to move the said tripartite piston against fluid pressure whereby a port in said ported cylinder is opened to apply an overriding pressure to the said barring relay piston to open the said barring servo-motor cylinder and pressure operated vent-valve to exhaust.

7. A starting device as claimed in claim 1, wherein the said running indicator comprises an oscillatory piston valve device arranged between the said source of fluid pressure and the said barring servo-motor and the said fluid pressure operated vent-valve, a link connection between the said piston valve device and the free piston assembly adapted to oscillate the said piston valve in dependence on the reciprocation of the said free piston assembly, the said piston valve device being adapted to establish the hydraulic connection with the said source of pressure when at rest and to cut it off when oscillating.

8. A starting device as claimed in claim 1 in which the said starting relay comprises a ported cylinder drained to exhaust at its inner end and adapted to be connected to the souce of fluid pressure at its outer end, a recessed piston valve adapted to move to-and-fro in the said ported cylinder, a spring adapted to bias the said piston valve towards the outer end of the said ported cylinder, the pipe connection controlled by the barring piston rod leading to a middle port of the said ported cylinder which is in communication with a recess of the said piston valve in any position of said valve, a pipe connection with the said master starting valve servo-motor of another port of the said ported cylinder adapted to be connected to exhaust in the outer position of the said piston valve and to be connected with the recess of the said piston valve in its inner position, a non-return valve arranged in the pipe connection between the said ported cylinder and the said master starting valve servo-motor adapted to open towards said servo-motor, a by-pass connection shunting the said non-return valve, and an adjustable leak-off arranged in the said by-pass connection forming a time-lag device adapted to keep the said master starting valve open for a time sufficient to enable a series of starting air impulses to be imparted to the free piston assembly through the starting air timing valve after fluid pressure from the said running indicator is removed.

9. A device as claimed in claim 8 comprising an extension of the said piston valve extending to the outside of the said ported cylinder as a means for manually moving the said piston valve into a position in which it establishes fluid connection between the said ports in the relay cylinder.

10. A starting device as claimed in claim 8 in which the said piston valve has two circular recesses, the one nearer the drained end of the said cylinder adapted to establish connection between the said ports, the other one nearer to the closed end being connected by a bore with the drained end of the said cylinder.

11. A starting device as claimed in claim 8 in which the said master starting valve servo-motor comprises two pistons, a compression spring between the said pistons, the one of said pistons being adapted to be exposed to fluid pressure from the said starting relay and the other one of said pistons being adapted to lift the said master starting air valve off its seat under the action of the said spring.

ROBERT JAMES WELSH.

REFERENCES CITED

The following references are of record in the file of this patent:

UNITED STATES PATENTS

| Number | Name | Date |
|---|---|---|
| 1,527,032 | Dollar | Feb. 17, 1925 |
| 1,871,265 | Frelin | Aug. 9, 1932 |
| 2,083,680 | Anderson et al. | June 15, 1937 |
| 2,168,828 | Pateras Pescara | Aug. 8, 1939 |
| 2,434,778 | Welsh | Jan. 20, 1948 |
| 2,434,877 | Welsh et al. | Jan. 20, 1948 |
| 2,472,934 | Beale | June 14, 1949 |
| 2,473,204 | Huber | June 14, 1949 |